U. G. BALLINGER.
AUTOMATIC SAFETY DEVICE.
APPLICATION FILED APR. 22, 1913.
1,090,011.
Patented Mar. 10, 1914.
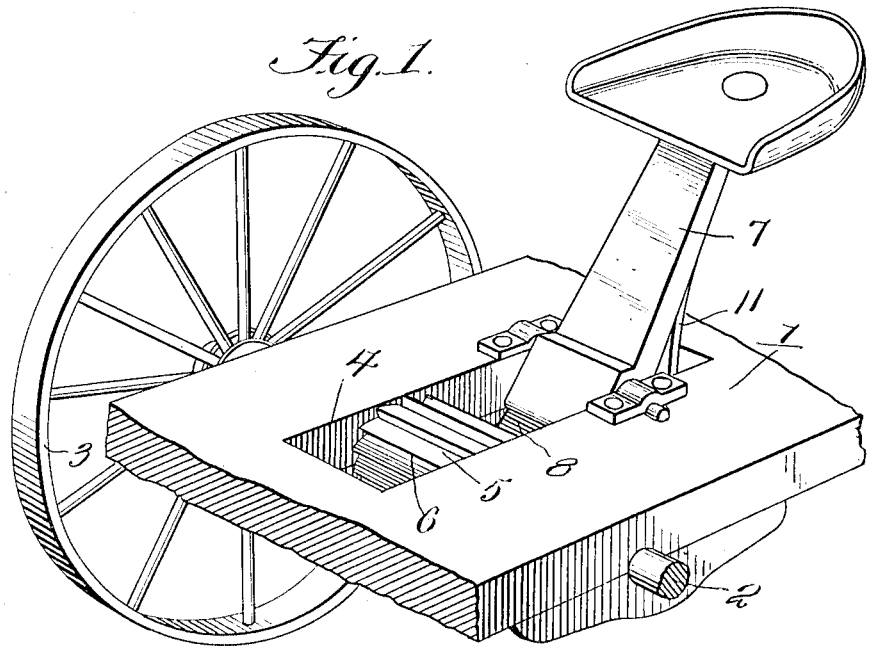
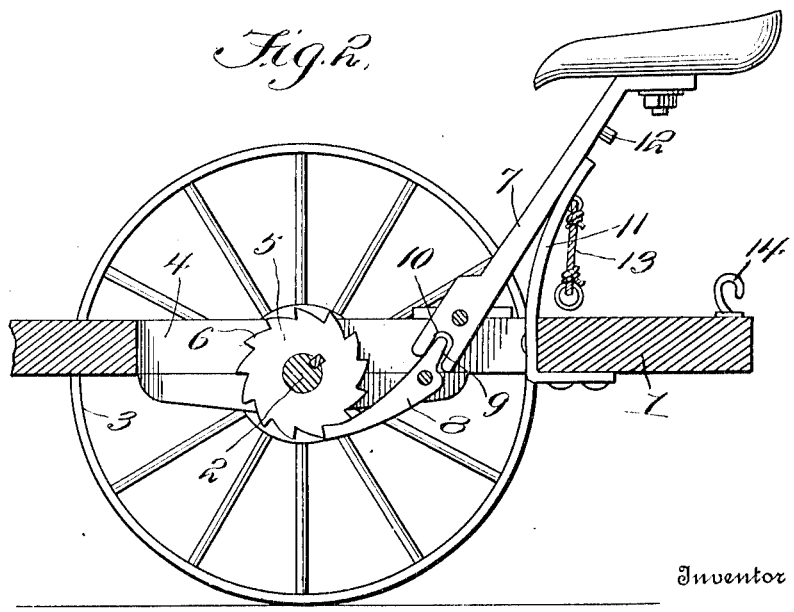
Witnesses
J. T. L. Wright
D. W. Gould
Inventor
U. G. Ballinger
By Victor J. Evans
Attorney

UNITED STATES PATENT OFFICE.

ULYSES G. BALLINGER, OF DEPASS, WYOMING.

AUTOMATIC SAFETY DEVICE.

1,090,011.   Specification of Letters Patent.   Patented Mar. 10, 1914.

Application filed April 22, 1913.   Serial No. 762,929.

*To all whom it may concern:*

Be it known that I, ULYSES G. BALLINGER, a citizen of the United States, residing at Depass, in the county of Fremont and State of Wyoming, have invented new and useful Improvements in Automatic Safety Devices, of which the following is a specification.

The invention relates to an automatic safety lock designed particularly for use with wheeled agricultural vehicles and designed to lock the wheels against turning in the absence of the driver from proper position on the seat of the vehicle.

The main object of the present invention is the provision of means which will automatically lock the vehicle against propulsion or forward travel in the absence of the driver or operator from the seat, whereby the vehicle is automatically held locked until the driver is in position to start the same thereby precluding accidents incident to sudden starting of machine in the absence of the driver, or if the driver should be thrown from the machine by the team attempting to run away.

The invention in its preferred form of details will be described in the following specification, reference being had particularly to the accompanying drawings, in which:—

Figure 1 is a perspective view illustrating sufficient of the vehicle to illustrate application of the invention thereto. Fig. 2 is a longitudinal section taken at one side of the gear.

Referring particularly to the accompanying drawings, wherein the preferred and simple type of the improvement is illustrated, it will be noted that the platform or main frame 1 of the vehicle is as usual, supported upon an axle 2 carrying ground wheels 3. In the event the main frame is in the form of a platform or more or less solid type, I form a longitudinally extending slot 4 therein to receive the structural parts of the present improvement.

Secured upon the axle 2 within the plane of the slot 4 thus formed is what I term an elongated gear 5 comprising a cylindrical body securely fixed upon and rotating with the axle and having longitudinally extending teeth 6 in the peripheral surface thereof. Pivotally mounted between the walls of the slot in rear of the gear 5 is a seat standard 7, the upper end of which carries the driver's seat. Pivotally mounted between the walls of the slot below the seat standard is a pawl or dog 8, the relatively forward end of which is arranged to coöperate with the teeth 6 of the gear 5, while the rear end is formed with an upwardly and rearwardly inclined projection 9 designed to seat in the transversely formed channel 10 in the lower end of the seat standard. By this arrangement of the parts it will be obvious that in the rearward movement of the upper end, the seat end of the standard or rear end, of the dog, will be elevated with the effect to withdraw the operative end from coöperation with the teeth 6.

As previously stated, the rearward movement of the upper end of the seat withdraws the dog from locking coöperation with the gear, and as it is desired under normal conditions to maintain coöperation of the dog with the gear, it is obvious that means must be provided for normally maintaining the upper end of the standard in relatively forward position. To this end I secure a leaf spring 11 to the platform the upper end of which bears against the rear of the seat standard and normally forces said upper end in the forward direction, thus maintaining the dog in coöperation with the gear, as will be evident. The spring 11 which is of leaf type, is arranged to coöperate with a stud 12 carried on the seat standard, whereby rearward movement of the standard is limited.

A flexible member 13 is secured to the spring and designed to be terminally connected to a hook 14 or other appropriate device on the frame or platform, so that the spring may be withdrawn at will from operative connection with the standard, permitting the standard, to incline rearwardly and upwardly to gravitate to position to disconnect the dog from the gear. By this means the driver may release the wheels when directing the movement of the machine from a position at the horses' heads or in transporting the machine from place to place, under which circumstances he will not necessarily be on the seat.

The gear teeth 6 are so disposed that when the dog is in locking coöperation therewith the ground wheels 3 are locked against forward movement, the reverse movement of the wheels permitting the teeth to override the dog.

It is obvious from the above description that with the driver in the seat his weight is sufficient to tilt the seat standard rearwardly against the tension of the spring and thus withdraw the dog from the gear and permit ordinary forward travel of the vehicle, while in the absence of the driver from the seat, either by accident or intention, the spring will operate the standard and cause the dog to engage the gear and lock the wheel.

The invention is designed particularly for farm implements, such as mowers or the like, and serves to lock the vehicle against forward travel in the absence of the driver from the seat, thereby preventing accident which usually occurs when the driver is compelled to leave the seat to adjust the parts and the team accidentally starts, or when the driver is thrown from his seat or the like in the event of a runaway.

What is claimed is:—

1. A wheeled vehicle including a gear secured upon a wheel carrying axle, a dog coöperating with the gear and a driver's seat connected with and operating the dog.

2. A wheeled vehicle including a gear secured upon a wheel carrying axle, a dog coöperating with the gear, a driver's seat connected with and operating the dog, and a spring for moving the seat in one direction.

3. A wheeled vehicle including a gear secured upon a wheel carrying axle, a dog coöperating with the gear, a driver's seat connected with and operating the dog, and a spring for moving the seat in one direction, the weight of the driver moving the seat in the opposite direction.

4. A wheeled vehicle including a gear secured upon a wheel carrying axle, a dog coöperating with the gear, a driver's seat connected with and operating the dog, a spring for moving the seat in one direction, the weight of the driver moving the seat in the opposite direction, and means for limiting the movement of the seat under the influence of the driver's weight.

5. A wheeled vehicle including a gear secured upon a wheel carrying axle, a dog coöperating with the gear, a driver's seat connected with and operating the dog, a spring for moving the seat in one direction, the weight of the driver moving the seat in the opposite direction, means for limiting the movement of the seat under the influence of the driver's weight, and means for relieving the seat from the influence of the spring.

6. A wheeled vehicle including an axle, a frame supported thereon, wheels carried by and rotatable with the axle, a gear fixed on the axle, a seat standard pivoted in the frame, means operated by the standard and coöperating with the gear to lock the gear with relation to the standard, and a seat carried by the upper end of the standard.

7. A wheeled vehicle including an axle, a frame supported thereon, wheels carried by and rotatable with the axle, a gear fixed on the axle, a seat standard pivoted in the frame, means operated by the standard and coöperating with the gear to lock the gear with relation to the standard, a seat carried by the upper end of the standard, and a spring secured to the frame and bearing against said standard.

8. A wheeled vehicle including an axle, a frame supported thereon, wheels carried by and rotatable with the axle, a gear fixed on the axle, a seat standard pivoted in the frame, means operated by the standard and coöperating with the gear to lock the gear with relation to the standard, a seat carried by the upper end of the standard, a spring secured to the frame and bearing against said standard, a stud carried by the standard and coöperating with the spring to limit the movement of the standard against the influence of the spring.

9. A wheeled vehicle including an axle, a frame supported thereon, wheels carried by and rotatable with the axle, a gear fixed on the axle, a seat standard pivoted in the frame, means operated by the standard and coöperating with the gear to lock the gear with relation to the standard, a seat carried by the upper end of the standard, a spring secured to the frame and bearing against said standard, a stud carried by the standard and coöperating with the spring to limit the movement of the standard against the influence of the spring, a connection secured to the frame and means carried by the frame to which connection may be secured to relieve the standard of the spring influence.

10. A wheeled vehicle including a gear operating simultaneously with at least one of the wheels, and means controlled automatically by the position of the driver's seat for coöperating with said gear to lock the wheel against movement or to release the same in accordance with the position of the seat.

In testimony whereof I affix my signature in presence of two witnesses.

ULYSES G. BALLINGER.

Witnesses:
JAMES W. STUCHELL,
JOHN W. GUDMUNDSEN.